US00RE46176E

(19) United States
(12) Reissued Patent
Paterson et al.

(10) Patent Number: US RE46,176 E
(45) Date of Reissued Patent: Oct. 11, 2016

(54) WATER CLOSET

(71) Applicant: Kohler Co., Kohler, WI (US)

(72) Inventors: Nicholas W. Paterson, Sheboygan, WI (US); Cecile Thalmann, Muiden (NL)

(73) Assignee: KOHLER CO., Kohler, WI (US)

(21) Appl. No.: 29/533,014

(22) Filed: Jul. 13, 2015

Related U.S. Patent Documents

Reissue of:
(64) Patent No.: Des. 621,918
Issued: Aug. 17, 2010
Appl. No.: 29/343,895
Filed: Sep. 21, 2009

U.S. Applications:
(62) Division of application No. 29/429,793, filed on Aug. 16, 2012, now Pat. No. Re. 45,669, which is an application for the reissue of Pat. No. Des. 621,918.

(51) LOC (10) Cl. ..... 23-02
(52) U.S. Cl.
USPC ..... D23/295
(58) Field of Classification Search
USPC ..... D23/295, 296, 301, 303, 313, 315; D3/273, 302; D9/424, 431; 4/440; D18/40, 36
CPC ..... E03D 3/12; E03D 11/10; E03D 5/10
See application file for complete search history.

(56) References Cited

U.S. PATENT DOCUMENTS

D203,381 S * 1/1966 Brown ..... D23/299
3,251,068 A * 5/1966 Milette ..... E03D 7/00 4/323

(Continued)

FOREIGN PATENT DOCUMENTS

CN 02374106.6 11/2002
CN 3302290 11/2002

(Continued)

OTHER PUBLICATIONS

Hastings Bath Collection, "Verso Toilet and Bidet"; HomePortfolio.com online catalog. Copyright 1997-2007; HomePortfolio.com.

(Continued)

*Primary Examiner* — Phillip S Hyder
(74) *Attorney, Agent, or Firm* — Foley & Lardner LLP

(57) CLAIM

The ornamental design for a water closet, as shown and described.

DESCRIPTION

*Notice: More than one reissue application has been filed for the reissue of U.S. Pat. No. D627,864; this application is a reissue divisional of application Ser. No. 29/421,144, filed May 17, 2012, which is an application for reissue of U.S. Pat. No. D627,864, both of which are incorporated herein by reference in there entireties; additionally, two other reissue divisional applications are being filed concurrently herewith for the reissue of U.S. Pat. No. D627,864.*

FIG. 1 is a right, top, front [perspective] *isometric* view of a water closet, embodying our new design;
FIG. 2 is a right side elevational view thereof;
FIG. 3 is a left side elevational view thereof;
FIG. 4 is a front elevational view thereof;
FIG. 5 is a top plan view thereof;
FIG. 6 is bottom plan view thereof; and,
FIG. 7 is a rear elevational view thereof.

The broken line representations in the figures are for the purpose of illustration only, and form no part of the claimed design.

In a preferred embodiment, the nature of this product is a plumbing fixture in the form of a water closet, which is primarily useful for receiving the liquid and solid waste of humans.

1 Claim, 4 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| 3,939,501 | A | * | 2/1976 | Sargent | A47K 11/02 4/317 |
| D250,344 | S | * | 11/1978 | Sargent | D23/299 |
| D255,597 | S | * | 6/1980 | Sargent | D23/299 |
| D256,722 | S | * | 9/1980 | Sargent | D23/295 |
| D257,385 | S | * | 10/1980 | Sargent | D23/299 |
| 4,603,443 | A | * | 8/1986 | Stewart | E03D 5/01 116/227 |
| D299,163 | S | * | 12/1988 | Robinson | D23/274 |
| D456,710 | S | * | 5/2002 | Persson | D9/431 |
| D494,667 | S | | 8/2004 | Kergoet | |
| D496,444 | S | | 9/2004 | Kergoet | |
| D500,126 | S | * | 12/2004 | Tani | D23/292 |
| D509,575 | S | | 9/2005 | Kergoet | |
| D532,492 | S | * | 11/2006 | Giese | D23/299 |
| D559,367 | S | | 1/2008 | Maruhashi | |
| D559,961 | S | | 1/2008 | Maruhashi | |
| D561,023 | S | * | 2/2008 | Jacxsens | D9/431 |
| D594,945 | S | | 6/2009 | Nakasaki et al. | |
| D603,488 | S | * | 11/2009 | Maruhashi | D23/295 |
| D612,026 | S | * | 3/2010 | Soulier | D23/295 |
| D615,173 | S | | 5/2010 | Arets | |

FOREIGN PATENT DOCUMENTS

| | | |
|---|---|---|
| CN | 200630050690.8 | 1/2003 |
| CN | 3376251 | 9/2003 |
| CN | 3652563 | 4/2006 |
| CN | 300730493 | 12/2006 |
| CN | 300894410 | 2/2007 |
| CN | 300739614 | 4/2007 |
| CN | 300801484 | 7/2007 |
| CN | 200730349563.2 | 11/2007 |
| CN | 300894410 | 2/2008 |
| CN | 300905381 | 3/2008 |
| CN | 300917296 | 3/2008 |
| EM | 000110531-0002 | 4/2004 |
| EM | 00026450-0005 | 2/2005 |
| EM | 000264502-0001 | 2/2005 |
| EM | 000264502-0002 | 2/2005 |
| EM | 000264502-0005 | 2/2005 |
| EM | 000284502-0002 | 2/2005 |
| EM | 000833835-0002 | 1/2008 |
| JP | 843438 | 4/1992 |
| JP | 843438-2 | 4/1992 |
| JP | 843438-3 | 4/1992 |
| JP | 843438-3 | 9/1992 |
| JP | 1283637 | 9/2006 |

OTHER PUBLICATIONS

Kohler Co., "Escale Dual Flush Toilet Tank"; HomePortfolio.com online catalog. Copyright 1997-2007 HomePortfolio.com.

Duravit, "2$^{nd}$Floor"; Model No. 011009; Duravit.com online catalog. Copyright 2008 Duravit.

* cited by examiner

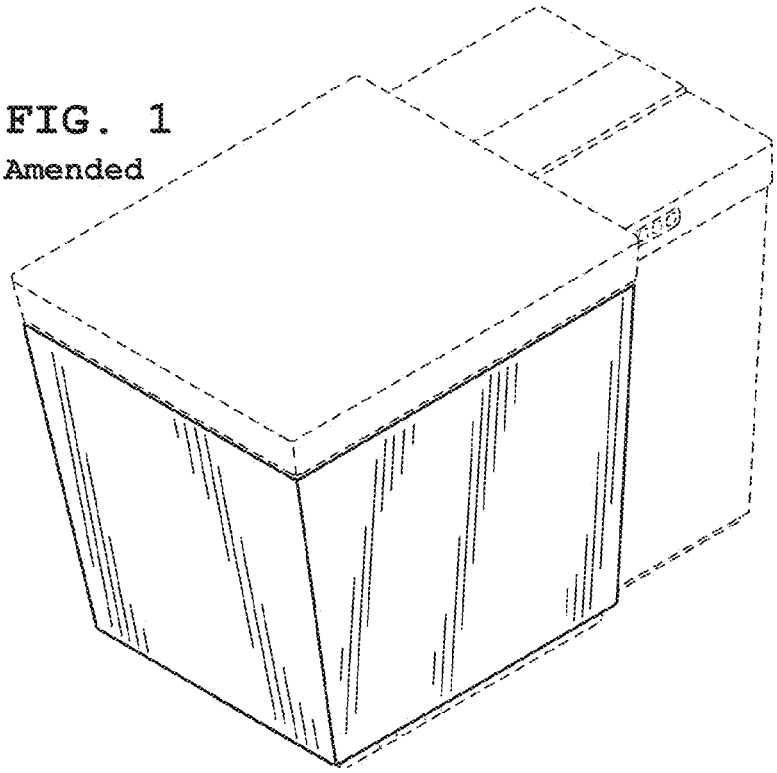
FIG. 1
Amended
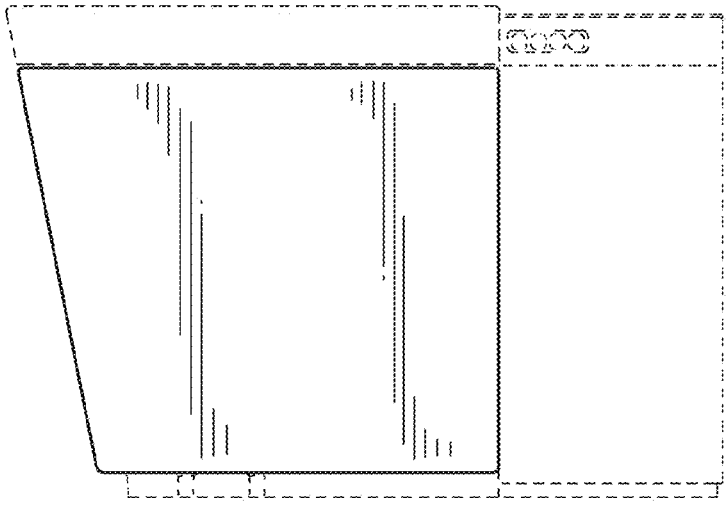
FIG. 2
Amended

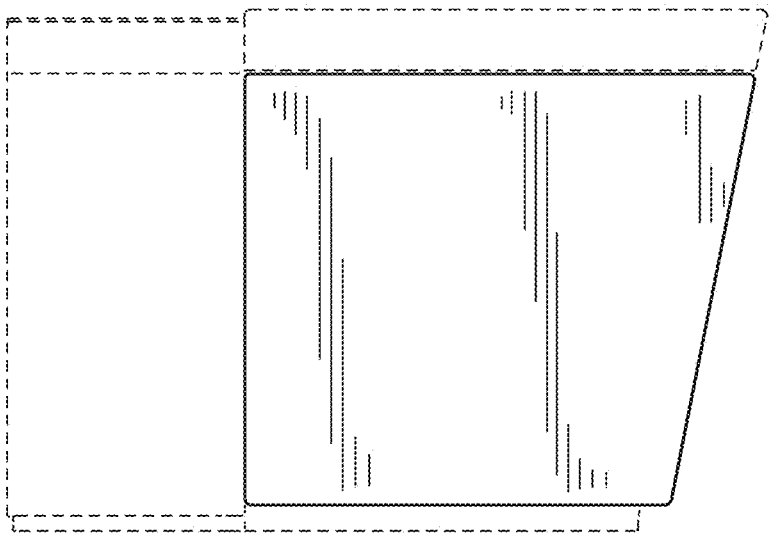
FIG. 3
Amended
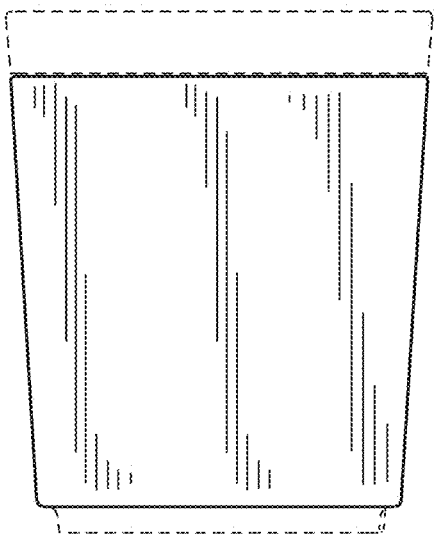
FIG. 4
Amended

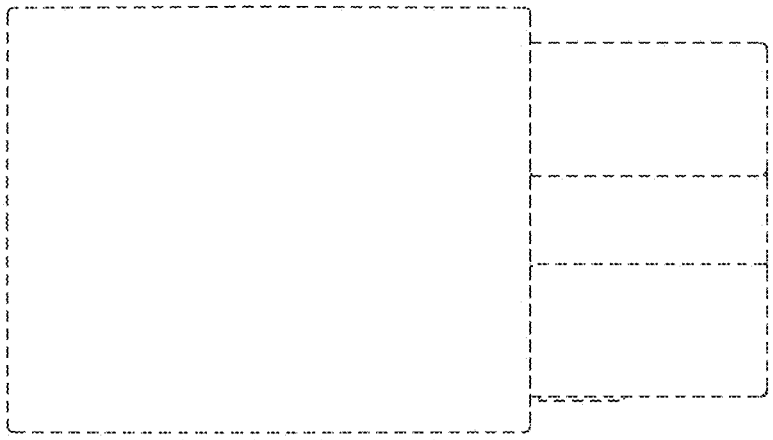
FIG. 5
Amended
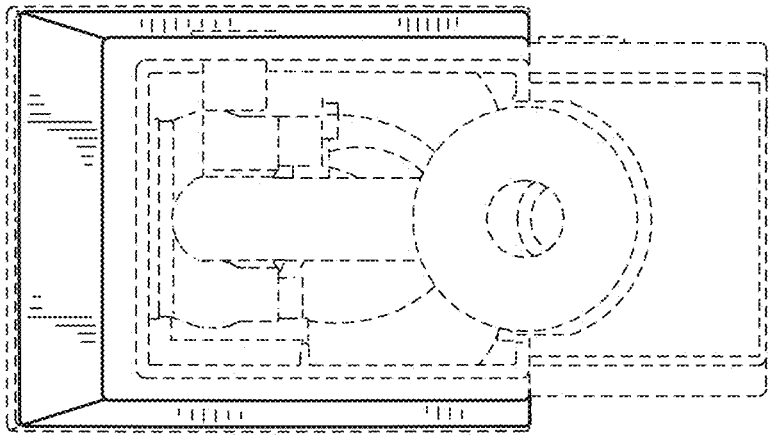
FIG. 6
Amended

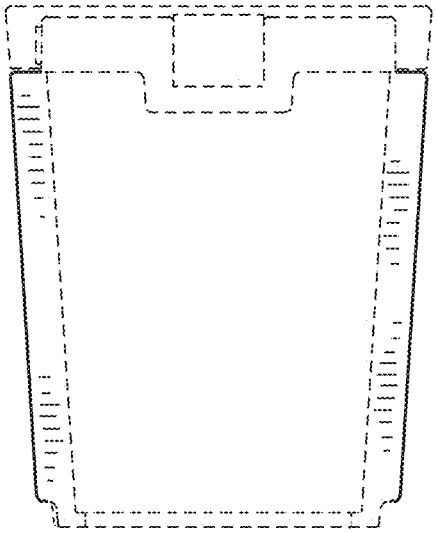
FIG. 7
Amended